Figures 1, 2:
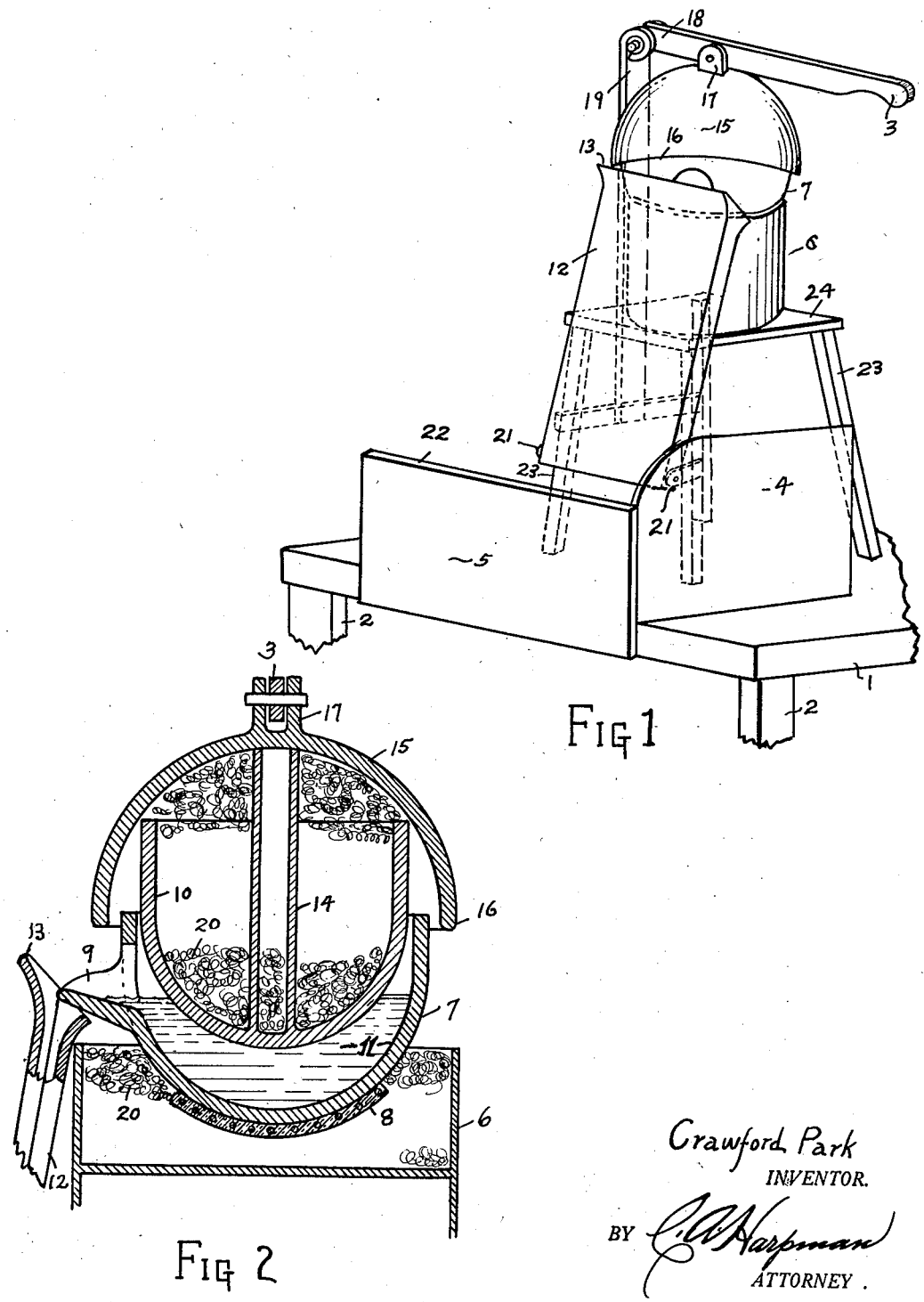

Feb. 16, 1937. C. PARK 2,070,975
SAFETY CASTING DEVICE
Filed April 29, 1935

Crawford Park
INVENTOR.

BY
ATTORNEY.

Patented Feb. 16, 1937

2,070,975

UNITED STATES PATENT OFFICE 2,070,975

SAFETY CASTING DEVICE

Crawford Park, Youngstown, Ohio

Application April 29, 1935, Serial No. 18,804

3 Claims. (Cl. 22—79)

This invention relates to melting pots to be used principally in connection with stereotype casting boxes.

The principal object is to provide a safe melting device such as may be used in any shop and more particularly in schools where the danger of accidents would naturally be greater.

A further object is to provide a device causing a liquid to flow from a pot or container by forcing a displacing member into the liquid in order to raise the level of the liquid to an overflow point, such as a spout or the like.

A further object is to provide a stereotype casting box with an outer plate elevated so as to cover outlet of a pot when a liquid is being poured in order to prevent the liquid being poured from splashing on anyone near the device.

A still further object is to position the casting box in an inclined and hinged relation to the safety melting pot.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a perspective view of the device.

Figure 2 is an enlarged detail sectional view of the melting pot and companion parts and showing a portion of the casting box partly in cross section By referring to the drawing it will be seen that there is provided a stand 1 provided with suitable legs 2. These legs 2 should be sufficiently long to maintain the device upon the stand at such an elevation that a controlling lever 3 can be easily reached by the operator. This stand 1 supports a second stand 24 having legs 23. It will also be seen that this stand 1 is provided with shields 4 and 5 in order to provide protection from splash from the melting pot.

By referring more particularly to Figure 2 it will be seen that there is provided a base member 6 which carries a melting pot 7. This melting pot 7 is provided with means for heating the same, preferably an electric unit 8. The size of the electric unit 8 is determined by the size and thickness of the pot 7. It will be seen that this pot 7 is provided with a spout 9. Positioned within the pot 7 there is a bowl shaped displacing member 10, the circumference of which is slightly less than the circumference of the pot 7 so that the same may be forced downwardly into the pot 7 so as to cause metal 11 to flow out of the spout 9 into a casting box 12. It will be noted that the upper end of the casting box 12 is provided with a splash shield 13 so that as the metal 11 is poured from the spout 9 into the casting box 12 there is no danger of splashing.

It will also be noted that the bowl shaped displacing member 10 is provided with a central vertical support 14 upon which rests a dome shaped cap member 15. This dome shaped cap member 15 is slightly larger at its lower circumferential edge 16 than the circumference of the pot 7 so that in operating, the dome shaped cap member 15 may telescope the upper portion of the pot 7.

By referring to Figure 1 it will be seen that the controlling lever 3 is pivotly secured to a bracket 17, which is centrally positioned upon the dome shaped cap member 15, and has its outer end 18 hinged to a support bar 19.

In the operation of the device, when the operator wishes to pour metal into the casting box 12 he pulls downwardly upon the controlling lever 3 causing the displacing member 10 to be forced downwardly into the pot 7 causing the metal 11 to rise and flow out through the spout 9. It will also be seen that in order to prevent the escape of heat, the dome shaped member 15, the displacing member 10, and the base member 6 are packed with mineral wool 20.

By referring to Figure 1 it will be seen that the casting box 12 is placed in an inclined position so that the upper end fits underneath the spout 9. It will also be seen that the lower end of the casting box 12 is hinged to a pair of oppositely disposed support arms 21 so that when the pouring process has been completed and the metal has had sufficient time to set, the casting box may be swung outwardly and rest in a horizontal position upon the upper edge 22 of the shield 5.

What I claim is:—

1. In a device of the class described, a bowl shaped melting pot, means for heating said bowl shaped melting pot, a base member for said melting pot, a bowl shaped displacing member functioning within said bowl shaped melting pot for the purpose of forcing metal to an outlet spout of the pot, a controlling lever for said displacing member, a dome shaped cap member for covering said bowl shaped melting pot and bowl shaped displacing member, said bowl shaped displacing member and central portion of said cap member packed with material to prevent heat radiation, means for holding said cap member and bowl shaped displacing member in fixed relation to each other.

2. In a device of the class described, a bowl shaped melting pot, means for heating said bowl shaped melting pot and means for supporting said melting pot, a bowl shaped displacing member functioning within said bowl shaped melting pot for the purpose of forcing metal to an outlet spout of the pot, a lever controlling said bowl shaped displacing member, a dome shaped cap member for covering said melting pot and bowl shaped displacing member, a support for connecting said cap member and bowl shaped displacing member, said bowl shaped displacing member and central portion of said cap member packed with mineral wool to prevent heat radiation, in combination with an inclined casting box having a splash shield formed thereon, a base member for said melting pot.

3. In a device of the class described, a bowl shaped melting pot, electric means for heating said bowl shaped melting pot, a stand for supporting said bowl shaped melting pot, shields on said stand for protection from splash from said bowl shaped melting pot, a bowl shaped displacing member functioning within said bowl shaped melting pot for the purpose of forcing metal to an outlet spout of the pot, a dome shaped cap member for covering said melting pot and said displacing member, a support connecting said cap member and said bowl shaped displacing member in a fixed relation to each other, a lever controlling said displacing member and said cap member, and said bowl shaped displacing member and central portion of said cap member packed with material to prevent heat radiation, in combination with an inclined hinged casting box having a splash shield formed thereon, a base member for said melting pot.

CRAWFORD PARK.